(12) United States Patent
Guisasola et al.

(10) Patent No.: US 12,553,401 B2
(45) Date of Patent: Feb. 17, 2026

(54) CYLINDER LINER AND METHOD FOR MANUFACTURING A CYLINDER LINER

(71) Applicant: Caterpillar Energy Solutions GmbH, Mannheim (DE)

(72) Inventors: Inigo Guisasola, Landau (DE); Olaf Berger, Dudenhofen (DE)

(73) Assignee: Caterpillar Energy Solutions GmbH, Mannheim (DE)

( * ) Notice: Subject to any disclaimer, the term of this patent is extended or adjusted under 35 U.S.C. 154(b) by 0 days.

(21) Appl. No.: 18/288,637

(22) PCT Filed: Apr. 26, 2022

(86) PCT No.: PCT/EP2022/025187
§ 371 (c)(1),
(2) Date: Oct. 27, 2023

(87) PCT Pub. No.: WO2022/228733
PCT Pub. Date: Nov. 3, 2022

(65) Prior Publication Data
US 2024/0209809 A1    Jun. 27, 2024

(30) Foreign Application Priority Data

Apr. 30, 2021 (GB) .................................. 2106285

(51) Int. Cl.
*F02F 1/00* (2006.01)
*B23B 1/00* (2006.01)

(52) U.S. Cl.
CPC ............ *F02F 1/004* (2013.01); *B23B 1/00* (2013.01); *F02F 2001/008* (2013.01); *F02F 2200/00* (2013.01)

(58) Field of Classification Search
CPC .. F02F 1/004; F02F 2001/008; F02F 2200/00; B23B 1/00
See application file for complete search history.

(56) References Cited

U.S. PATENT DOCUMENTS

| | | |
|---|---|---|
| 6,298,818 B1 | 10/2001 | Koyama et al. |
| 7,334,546 B2 | 2/2008 | Rasmussen |
| 2004/0226547 A1 | 11/2004 | Holzleitner et al. |

FOREIGN PATENT DOCUMENTS

| | | | |
|---|---|---|---|
| CN | 2703132 Y | * 6/2005 | |
| DE | 4415825 A1 | 11/1995 | |
| DE | 19908605 C2 | * 12/2000 | ............. F02F 1/102 |
| DE | 102016013783 A1 | 5/2018 | |

(Continued)

OTHER PUBLICATIONS

Machine Translation of CN 2703132 Y PDF File Name: "CN2703132Y_Machine_Translation.pdf".*

(Continued)

*Primary Examiner* — Lindsay M Low
*Assistant Examiner* — Ruben Picon-Feliciano

(57) ABSTRACT

The present invention refers to a cylinder liner for an internal combustion engine, comprising a flange having a seat-engaging surface which is configured for bearing onto a flange seat of an engine block, and wherein the seat-engaging surface has a sloped portion which extends along at least a half of a radial length of the seat-engaging surface and which is inclined relative to a radial plane being normal to a longitudinal axis of the cylinder liner.

12 Claims, 4 Drawing Sheets

(56) References Cited

FOREIGN PATENT DOCUMENTS

GB      1215112 A    12/1970
JP      3755389 B2    3/2006

OTHER PUBLICATIONS

Machine Translation of DE19908605C2 PDF File Name: "DE19908605C2_Machine_Translation.pdf" (Year: 2000).*
Great Britain Search Report related to Application No. GB2106285.6; reported on Sep. 28, 2021.
International Search Report related to Application No. PCT/EP2022/025187; reported on Jul. 26, 2022.

* cited by examiner

CYLINDER LINER AND METHOD FOR MANUFACTURING A CYLINDER LINER

CROSS-REFERENCE TO RELATED APPLICATION

This application is a USC § 371 US National Stage filing International Application No. PCT/FP2022/025187 filed on Apr. 26, 2022 which claims priority under the Paris Convention to Great Britain Patent Application 2106285.6 filed on Apr. 30, 2021.

TECHNICAL FIELD

The present invention refers to a cylinder liner for an internal combustion engine and to a method for manufacturing such a cylinder liner.

TECHNOLOGICAL BACKGROUND

In internal combustion (IC) engines, cylinder liners, also referred to as sleeves, are inserted into an engine block of the IC engine to form an inner wall of a cylinder which receives and guides a piston. For ensuring proper positioning of the cylinder liner relative to the engine block, the cylinder liner is provided with a radially extending flange which is designed corresponding to a flange seat in the engine block. Specifically, the flange is designed so as to extend circumferentially around a hollow-cylindrical body of the cylinder liner at an upper end thereof. In this structural configuration, the highest stresses and loads in the cylinder liner during installation and operation of the engine usually occur at the location of an arcuate or radiused fillet at a juncture of the outer surface of the cylinder with the lower surface of the flange. This particularly applies for configurations of the cylinder liner, in which, at this location, the thickness of the wall of the cylinder liner is further reduced by an undercut provided at the fillet to provide room for tool run-out so as to allow machining of the outer surface of the cylinder wall.

For adapting the material characteristics of the cylinder liner at the location of the fillet to the specific application, particularly to increase its fatigue strength, it is known to subject the cylinder liner to additional manufacturing processes. For example, it is known to subject the fillet of the cylinder liner to a rolling process in which a turning tool or roller is guided along the fillet, while exerting a process force. In this way, a force flow optimized design of the cylinder liner may be achieved, thereby increasing its fatigue strength. These approaches, however, may be costly and time consuming.

SUMMARY OF THE INVENTION

Starting from the prior art, it is an objective to provide an improved cylinder liner which particularly has improved application specific characteristics, such as an increased fatigue strength or tightness, and can be manufactured cost and time efficiently. It is a further objective to provide a method for manufacturing such a cylinder liner.

These objectives are solved by means of the subject matter of the independent claims. Preferred embodiments are set forth in the present specification, the Figures as well as the dependent claims.

Accordingly, a cylinder liner is provided for an internal combustion engine, comprising a flange having a seat-engaging surface which is configured for bearing onto a flange seat of an engine block, and wherein the seat-engaging surface has a sloped portion which extends along at least a half of a radial length of the seat-engaging surface and which is inclined relative to a radial plane being normal to a longitudinal axis of the cylinder liner.

Furthermore, a method for manufacturing such a cylinder liner is provided, comprising a step of machining the seat-engaging surface of the flange so as to form the sloped portion of the seat-engaging surface.

BRIEF DESCRIPTION OF THE DRAWINGS

The present disclosure will be more readily appreciated by reference to the following detailed description when being considered in connection with the accompanying drawings in which.

DETAILED DESCRIPTION OF PREFERRED EMBODIMENTS

Figure 1:
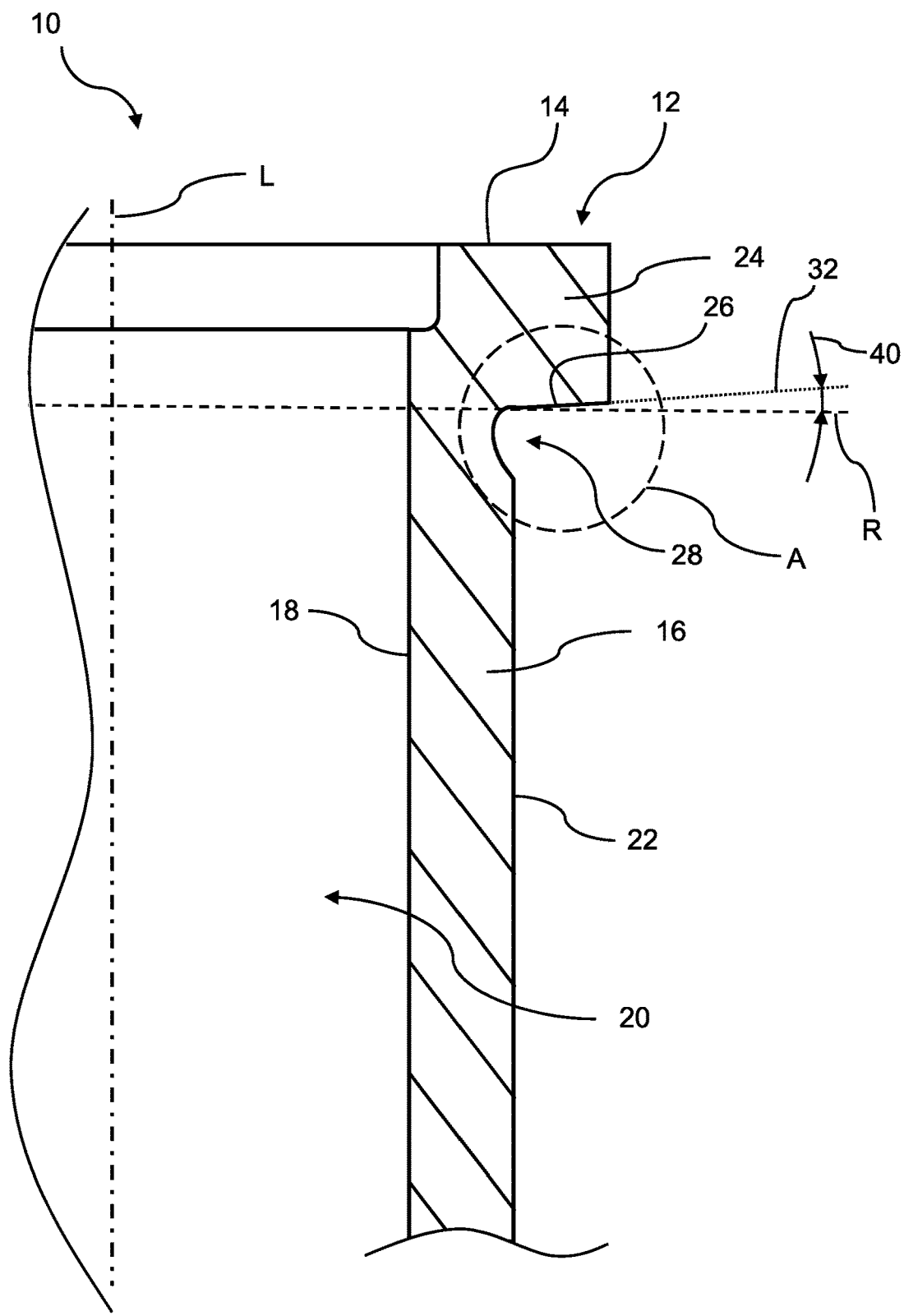
FIG. 1 schematically shows a partial longitudinal cross-section through a cylinder liner.

In the following, the invention will be explained in more detail with reference to the accompanying Figures. In the Figures, like elements are denoted by identical reference numerals and repeated description thereof may be omitted in order to avoid redundancies.

FIG. 1 shows a partial view of a longitudinal cross-section through a cylinder liner 10 for an internal combustion engine, in particular a reciprocating engine, such as a diesel engine, having a plurality of cylinders. The cylinder liner 10 is designed to be inserted or pressed into an engine block of the engine, to form an inner wall of a cylinder. As such, the cylinder liner 10 is designed to receive and guide a piston of the engine and to circumferentially delimit a combustion chamber of the cylinder. Typically, large diesel engines comprise a crankcase and an engine block mounted thereon which both delimit a receiving space for a crankshaft of the engine. The crankshaft is connected to the pistons received in the cylinders via a piston rod, respectively. On top of the engine block, a cylinder head is mounted which delimits the combustion chambers from above. Alternatively, the engine block and the crankcase may be provided as an integral part instead of two separate parts. In such a configuration, the cylinder liner thus is inserted or pressed into the crankcase being provided with bores for the cylinders.

In FIG. 1, the cylinder liner 10 is depicted in a disassembled state in which it is disassembled from the engine block, i.e. not inserted in the crankcase. The cylinder liner 10 is provided such that, when being inserted into the engine block of the engine, a first end 12 thereof, also referred to as an upper end, forms a part of a contact surface of the engine block on which a cylinder head gasket is to be received and accordingly the cylinder head is to be mounted. In other words, a front surface 14 of the first end 12 of the cylinder liner 10 is configured to form a part of the contact surface of the engine block for the cylinder head gasket in a state in which the cylinder liner 10 is installed in the engine, i.e. by being inserted into the crankcase. As such, the first end 12 of the cylinder liner 10 is intended to cooperate with the cylinder head of the engine.

The basic characteristic and function of a cylinder liner and an engine equipped with such a cylinder liner are well known to a person skilled in the art and are thus not further specified. Rather, characteristics of the cylinder liner 10, particularly in view of its structural configuration, interlinked with the present invention are addressed in the following.

As can be gathered from FIG. 1, the cylinder liner 10 is constituted by a hollow body in the form of a sleeve extending along a longitudinal axis L of the cylinder liner 10. Specifically, the cylinder liner 10 extends circumferentially around the longitudinal axis L, wherein particularly a basic shape of the cylinder liner 10 is rotationally symmetric or substantially rotationally symmetric to the longitudinal axis L.

Specifically, the cylinder liner 10 comprises a hollow cylindrical part formed by a wall 16 extending circumferentially around the longitudinal axis L. The wall 16 of the cylinder liner 10 is a narrow member which, in a mounted state of the cylinder liner 10 in which the cylinder liner 10 is pressed into the engine block, extends circumferentially around the piston and is thus interposed between the piston and the engine or cylinder block in a radial direction. An inner surface 18 of the wall 16 circumferentially delimits a bore or through-hole 20 which is designed to accommodate and receive the piston. As such, the inner wall 18 forms a contact or guiding surface for the piston having piston rings which seals and physically guides the piston. Accordingly, in the mounted state of the cylinder liner 10, the inner surface 18 of the wall 16 is in continual contact with an outer surface of the piston, i.e. the piston rings, throughout a piston stroke. Specifically, in this configuration, the piston rings serve to seal the combustion chamber from the crankcase. Further, the piston rings ensure that a proper quantity of oil is present between the piston and the cylinder liner to reduce friction and thus any unintended heat generation due to friction. As such, the piston rings are configured to regulate oil consumption by scraping oil from the inner surface 18 of the cylinder liner 10. Further, the wall 16 is provided with a cylindrical or generally cylindrical outer surface 22.

A flange 24 is provided at the first end 12 of the cylinder liner 10. The flange 24 extends radially beyond the wall 16. In this context, the term "radially" means in a direction which points away from the longitudinal axis L and is perpendicular thereto. Accordingly, the flange 24 may also be referred to as a radial flange or radially extending flange.

As can be gathered from FIG. 1, an upper flange surface of the flange 24 forms the above-described front surface 14 of the cylinder liner 10. Opposed to the upper surface, the flange 24 is provided with a lower flange surface 26, also referred to as the "seat-engaging surface" in the following. The seat-engaging surface 26 is configured for bearing onto a flange seat of the engine block. That is, in the mounted state of the cylinder liner 10, the seat-engaging surface 26 of the cylinder liner 10 bears on a bottom surface of the flange seat of the engine block, wherein the bottom surface of the flange seat is perpendicular to the longitudinal axis L of the cylinder liner 10.

In the shown configuration, the wall 16 extends axially downward from the flange 24, i.e. in a direction parallel to the longitudinal axis L which points from the first end 12 to an opposed second end of the cylinder liner 10. Specifically, the wall 16 extends axially downward at a juncture 28 between the flange 24, particularly the contact surface 26 of the flange 24, and the cylindrical outer surface 22 of the wall 16. Typically, at the location of the juncture 28, the cylinder liner 10 is subjected to high loads and stresses during both installation of the cylinder liner 10 and operation of the engine.

Figure 2:
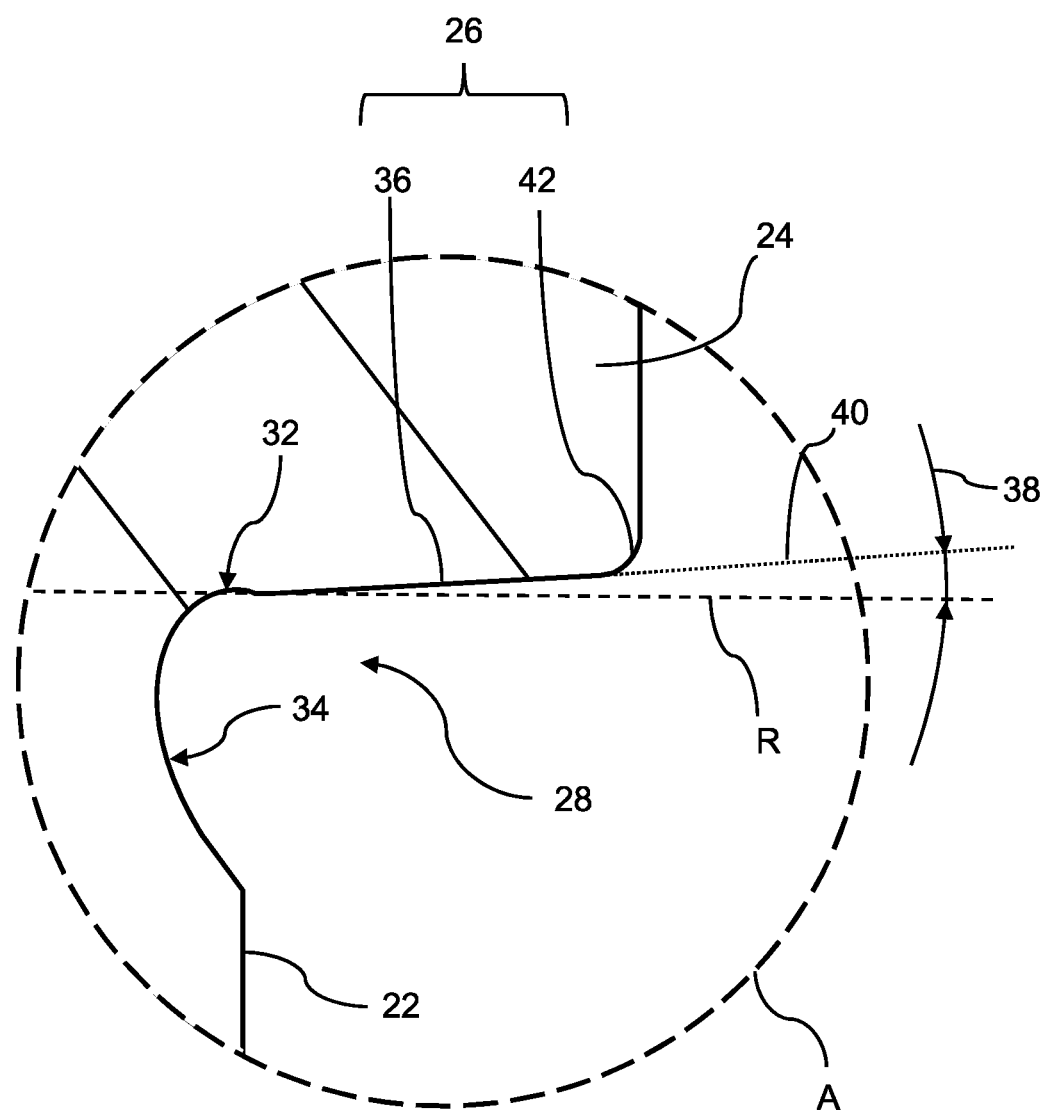
FIG. 2 schematically shows an enlarged section A of the cylinder liner depicted in FIG. 1.

As can be gathered from FIG. 2, the seat-engaging surface 26 terminates inward at an arcuate fillet 32, preferably a radius, which is located at the juncture 28 of the flange 24 and the wall 16. The fillet 32 connects with a conical or angularly configured undercut 34 which merges into the outer surface 22 of the wall 16, particularly at a short distance away from the juncture 28. In other words, the fillet 32 connects with the undercut portion 34 provided in the outer surface 22 of the wall 16. Alternatively, the fillet may be other than a radius and the undercut may be other than conical.

The suggested cylinder liner 10 is provided with the flange 24, the seat-engaging surface 26 of which is slightly sloped or inclined relative to a radial plane R.

In the context of the present disclosure, the term "radial plane" refers to an auxiliary plane, i.e. an imaginary plane, which is normal to the longitudinal axis L of the cylinder liner 10. In an embodiment, the plane R may be parallel to the front surface 14 of the first end 12.

Specifically, as can be gathered from FIG. 2, the seat-engaging surface 26 has a sloped portion 36 which extends along at least a half of a radial length of the seat-engaging surface 26 and which is inclined about 10 to 50 angular minutes relative to the radial plane R.

In the context of the present disclosure, the term "radial length of the seat-engaging surface 26" refers to a length of the seat-engaging surface 26 in a radial direction. In other words, in the shown configuration, the radial length of the seat-engaging surface 26 refers to a distance along the radial direction between the outer surface 22 of the wall 16 and a radial outer end of the flange 24.

The slope of the seat-engaging surface 26 relative to the radial plane R is visualized in FIGS. 1 and 2 by means of an angle 38 extending between the radial plane R and an auxiliary line 40 which is an imaginary extension of and is thus parallel to the sloped portion 36 of the seat-engaging surface 26.

Specifically, the seat-engaging surface 26, in particular the sloped portion 36 thereof, is inclined towards the first end 12, particularly the front face 14, of the cylinder liner 10. In other words, the seat-engaging surface 26, in particular the sloped portion 36 thereof, is inclined upwardly, i.e. in a direction parallel to the longitudinal axis which points from the opposed second end of the cylinder liner 10, i.e. which is opposed to the first end 12, to the first end 12. The flange 24 may be provided with a tapered shape in the radial direction. That is, a thickness of the flange along the longitudinal axis L may decrease in radial direction.

The cylinder liner 10 is configured such that, in the mounted state, the flange 24 is subjected to compressive forces, particularly exerted by the cylinder head, which bend or shift the flange 24, i.e. downwardly, compared to the disassembled state. Specifically, in the mounted state, the flange 24 is bent or shifted such that the seat-engaging surface 26, in particular its sloped portion 36, bears onto the bottom surface of the flange seat. In other words, since the bottom surface of the flange seat extends perpendicular or substantially perpendicular to the longitudinal axis L of the cylinder liner 10 and thus parallel to the radial plane R, the seat-engaging surface 26, in particular its sloped portion 36, extends also parallel or substantially parallel to the radial plane R in the mounted state. In other words, in the mounted state of the cylinder liner 10, the seat-engaging surface 26, in particular its sloped portion 36, is no longer inclined relative to the radial plane R compared to the disassembled state of the cylinder liner 10.

It has been found that, due to the bending of the flange 24 in the mounted state caused by the geometric design of the sloped seat-engaging surface 26, compressive forces and stresses are induced at the location of the junction 28, in particular the fillet 32, which, surprisingly, may contribute to an increased fatigue strength of the cylinder liner 10. Further, the design of the sloped seat-engaging surface 26 may contribute to an improved tightness between the cylinder liner 10 and the engine block or crankcase such that the suggested configuration is less prone to oil leakage. This is particularly true if the flange 24, particularly the seat-engaging surface 26, is subjected to cavitation, bearing or fretting, which frequently occur during the first few thousand hours of operation, i.e. when the cylinder liner 10 is put into operation.

Further, the seat-engaging surface 26 comprises a radially outer end section in the form of a burred end section 42. In the shown configuration, the sloped surface 36 extends along more than a half of the radial length of the seat-engaging surface 26. Specifically, as can be gathered from FIG. 2, the sloped surface 36 extends along at least 80% or 90% of the radial length of the seat-engaging surface 26.

The sloped portion 36 of the seat-engaging surface 26 is arranged adjacent to the fillet 32 at one end and adjacent to the burred end section 42 at the other end. In other words, the sloped portion 36 of the seat-engaging surface is connected directly to the fillet 32 and the burred end section 42. Accordingly, the sloped portion 36 of the seat-engaging surface extends from the burred end section 42 to the fillet 32.

In a further development, the cylinder liner 10 may be designed such that, in the disassembled state, the front surface 14 of the flange 24, at least partly, extends parallel to the sloped portion 36 of the seat-engaging surface 26. Alternatively or additionally, the front surface 14 of the flange 24, at least partly, may extend parallel to the radial plane R in the disassembled state.

In the shown configuration, the seat-engaging surface 26, in particular its sloped portion 36, is manufactured by a subtractive manufacturing process. In the context of the present disclosure, the term "subtractive manufacturing process" refers to any manufacturing process in which a work piece is subjected to controlled material removal. Specifically, the seat-engaging surface 26, in particular its sloped portion 36, is manufactured by machining. For doing so, machine tools are typically used to cut the work piece into a desired shape. Specifically, the controlled material removal may be performed by turning, drilling, milling, etc. For example, the seat-engaging surface 26, in particular its sloped portion 36, may be machined with a lathe or milling machine In the following, under reference to FIGS. 3 to 5, a method for manufacturing the above-described cylinder liner 10 is specified.

Figure 3:
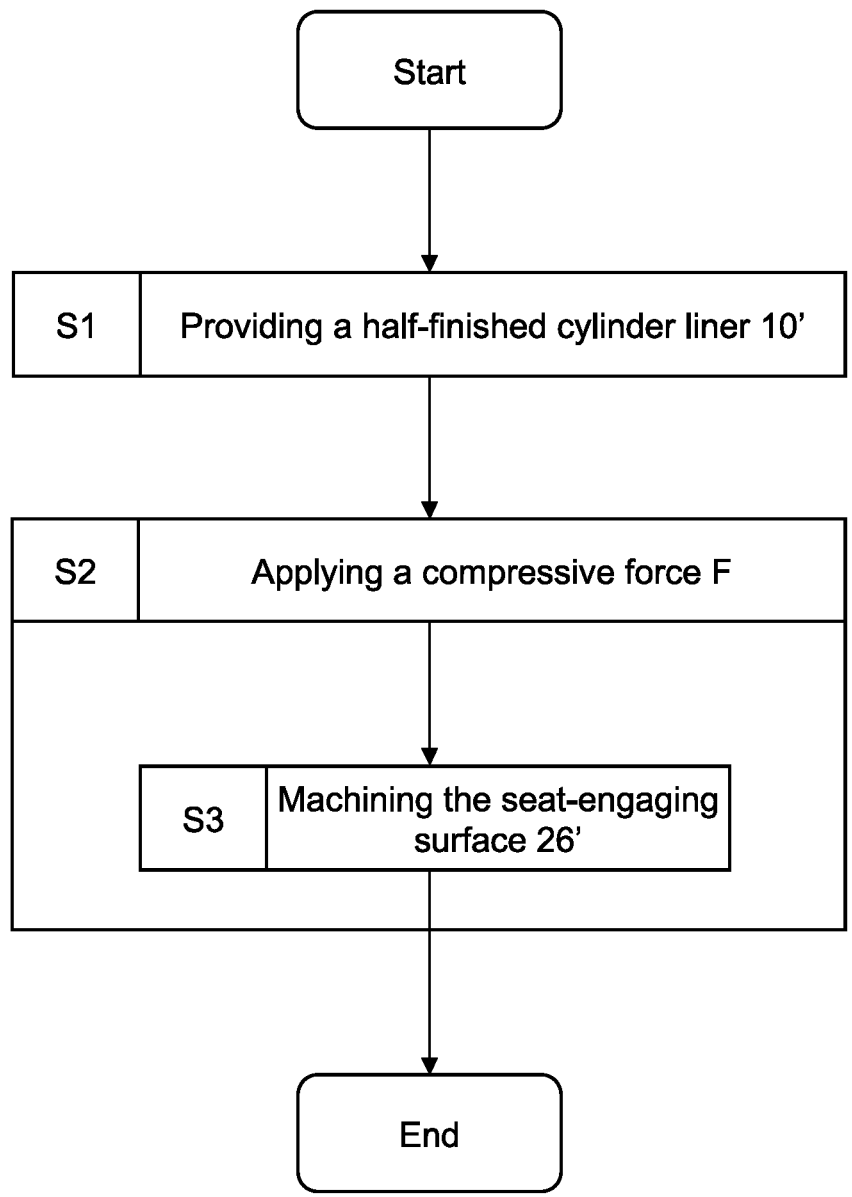
FIG. 3 shows a flow diagram illustrating a method for manufacturing the cylinder liner depicted in FIG. 1.
Figure 4:
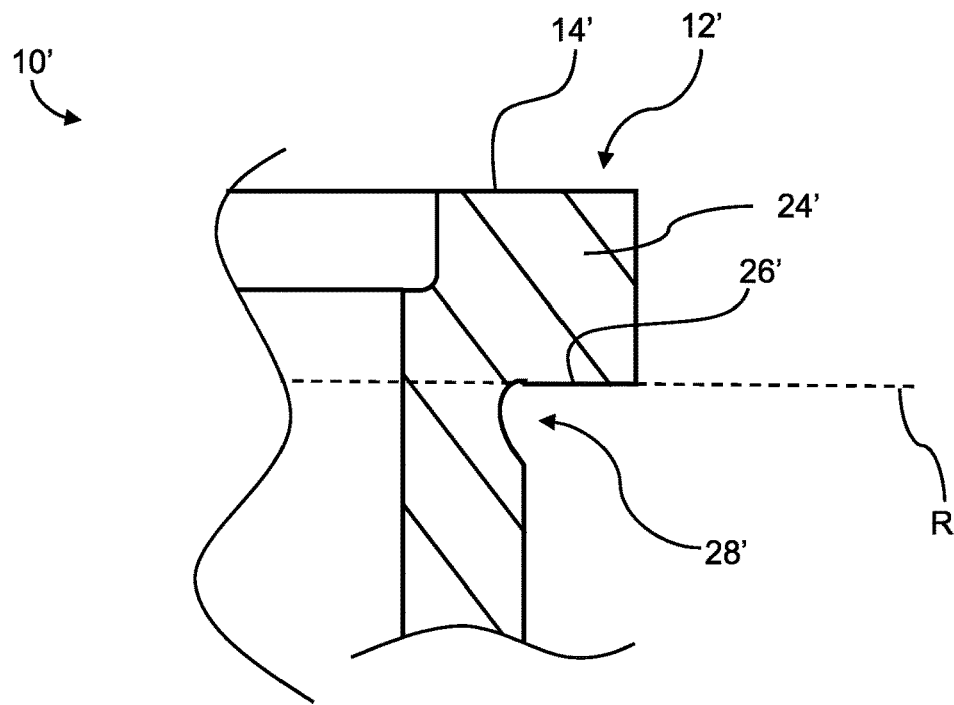
FIG. 4 schematically shows a longitudinal section through a half-finished cylinder liner provided in a first step of the method depicted in FIG. 3.
Figure 5:
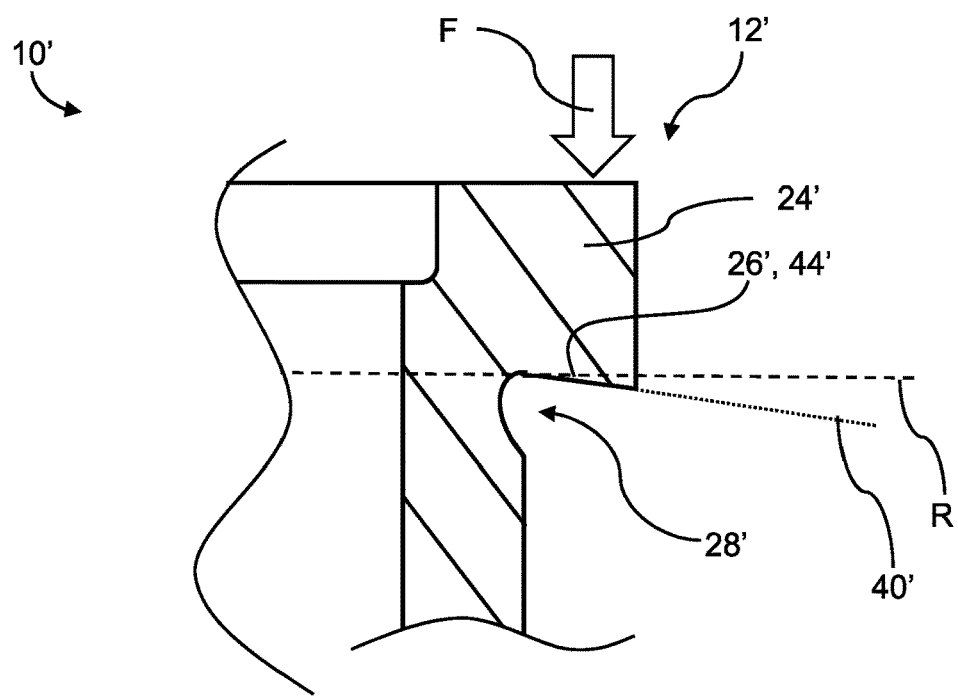
FIG. 5 schematically shows a longitudinal section through the half-finished cylinder liner at the beginning of a second step of the method depicted in FIG. 3.

FIG. 3 depicts a flow diagram of the method. In a first step S1, a half-finished cylinder liner 10' is provided which is depicted in FIG. 4. In the following, for indicating that a component refers to the half-finished cylinder liner 10', the corresponding reference signs are marked by an inverted comma.

The half-finished cylinder liner 10' is provided with a seat-engaging surface 26' which extends parallel or substantially parallel to the radial plane R. In other words, the seat-engaging surface 26' of the half-finished cylinder liner 10' is not provided with a sloped portion being inclined about 10 to 50 angular minutes relative to the radial plane R.

Then, in a next step S2, a compressive force F is applied onto the first end 12', in particular the front surface 14', of the half-finished cylinder liner 10'. Specifically, the compressive force F is parallel to the longitudinal axis L and points from the flange 24' towards the opposed second end of the half-finished cylinder liner 10', i.e. downwards. More specifically, this step is performed such that the flange 24' is bent or shifted downwardly, i.e. towards the opposed second end of the half-finished cylinder liner 10' arranged opposed to the first end 12'. As a result, the seat-engaging surface 26' is inclined relative to the radial plane R' in a direction towards the opposed second end of the half-finished cylinder liner 10'. In other words, the step S2 of applying the compressive force is applied such that the seat-engaging surface 26' of the half-finished cylinder liner 10' has a part 44' which extends along at least a half of the radial length of the seat-engaging surface 26' of the half-finished cylinder liner 10' and which is inclined relative to the radial plane R in an opposed direction compared to the sloped portion 36 of the finished cylinder liner 10 as depicted in FIGS. 1 and 2.

Then, while the step of applying the compressive force is performed, i.e. while the compressive force is applied, a step S3 of machining the seat-engaging surface 26' of the half-finished cylinder liner 10' is performed. Specifically, in this step, the half-finished cylinder liner 10' is machined, e.g. by a lathe or milling machine, such that material is removed from the seat-engaging surface 26'. This is performed in a controlled manner such that the machined part of the seat-engaging surface 26' extends parallel or substantially parallel to the radial plane R while the compressive force is applied so as to generate the finished cylinder liner 10 as described above. This is because, when the compressive force acting onto the first end 12 is removed, the flange 24 of the finished cylinder liner 10 is released, i.e. bent back, thereby taking the shape as shown in FIGS. 1 and 2 having the sloped seat-engaging surface 26.

It will be obvious for a person skilled in the art that these embodiments and items only depict examples of a plurality of possibilities. Hence, the embodiments shown here should not be understood to form a limitation of these features and configurations. Any possible combination and configuration of the described features can be chosen according to the scope of the invention.

A cylinder liner for an internal combustion engine may be provided, comprising a flange having a seat-engaging surface which is configured for bearing onto a flange seat of an engine block, and wherein the seat-engaging surface has a sloped portion which extends along at least a half of a radial length of the seat-engaging surface and which is inclined relative to a radial plane being normal to a longitudinal axis of the cylinder liner.

The cylinder liner may be intended and configured to be used in any suitable internal combustion engine having at least one cylinder, in particular a reciprocating engine such as a Diesel engine. Specifically, the cylinder liner is configured to be pressed into an engine block or a crankcase, of the engine.

Specifically, the cylinder liner may be configured such that, in a dissembled state, the sloped portion is inclined about 10 to 50 angular minutes relative to a radial plane.

Further, the flange may be provided at a first end of the cylinder liner and the sloped portion of the seat-engaging surface is inclined towards the end surface of the cylinder liner.

In a further development, the cylinder liner may be designed such that, in a mounted state in which the cylinder liner is installed in the engine, the flange is bent or shifted such that the sloped portion of the seat engaging surface bears on a bottom surface of the flange seat which is parallel to the radial plane.

The sloped portion of the seat-engaging surface may extend along at least 60% or 70% 80% or 90% of the radial length of the seat-engaging surface.

Further, cylinder liner may comprise a hollow body formed by a wall extending circumferentially around the longitudinal axis, wherein the sloped portion of the seat-engaging surface may be connected to an outer surface of the wall via or at a fillet. The fillet may connect with an undercut portion provided in the outer surface of the wall.

Additionally, the sloped portion of the seat-engaging surface extends from a radially outer end section of the seat-engaging surface towards or to the fillet.

In a further development, the flange may comprise a front surface being arranged opposed to the seat-engaging surface, wherein the flange may be designed such that the front surface of the flange, at least partly, extends parallel to the sloped portion of the seat-engaging surface or parallel to the radial plane R.

Alternatively or additionally, the sloped portion of the seat-engaging surface is manufactured by a subtractive manufacturing process, in particular by machining.

Furthermore, a method may be provided for manufacturing such the above-described cylinder liner, comprising a step of machining the seat-engaging surface of the flange so as to form the sloped portion of the seat-engaging surface. In a further development, the method may comprise a step of providing a half-finished cylinder liner; and a step of applying a compressive force onto a first end of the half-finished cylinder liner, wherein the step of machining the seat-engaging surface of the flange may be carried out while the step of applying the compressive force is performed. Further, the step of applying the compressive force may be performed such that the seat-engaging surface of the half-finished cylinder liner has a part which extends along at least a half of the radial length of the seat-engaging surface and which is inclined relative to the radial plane in an opposed direction compared to the sloped portion of the cylinder liner.

INDUSTRIAL APPLICABILITY

With reference to the Figures, a cylinder liner for an internal combustion engine is suggested. The cylinder liner as mentioned above is applicable in any reciprocating engine. The suggested e cylinder liner may replace conventional cylinder liners and may serve as a replacement or retrofit part.

The invention claimed is:

1. A cylinder liner for an internal combustion engine, comprising a flange having a seat-engaging surface, and wherein the seat-engaging surface has a sloped portion which extends along at least a half of a radial length of the seat-engaging surface and which is inclined, in a dissembled state, relative to a radial plane being normal to a longitudinal axis of the cylinder liner;

the cylinder liner is designed such that, in a mounted state in which the cylinder liner is installed in the engine, the flange is bent or shifted such that the flange is parallel to a radial plane and perpendicular to the longitudinal axis of the cylinder liner.

2. The cylinder liner according to claim 1, wherein the sloped portion is inclined about 10 to 50 angular minutes (0.17° to) 0.83° relative to the radial plane.

3. The cylinder liner according to claim 1, wherein the flange is provided at a first end of the cylinder liner including a front surface and the sloped portion of the seat-engaging surface is inclined towards the front surface of the cylinder liner.

4. The cylinder liner according to claim 1, which further comprises a hollow body formed by a wall extending circumferentially around the longitudinal axis, wherein the sloped portion of the seat-engaging surface is connected to an outer surface of the wall via or at a fillet.

5. The cylinder liner according to claim 4, wherein the fillet connects with an undercut portion provided in the outer surface of the wall.

6. The cylinder liner according to claim 4, wherein the sloped portion of the seat-engaging surface extends from a radially outer end section of the seat-engaging surface towards or to the fillet.

7. The cylinder liner according to claim 1, wherein the flange comprises the front surface being arranged opposed to the seat-engaging surface, and wherein the flange is designed such that the front surface of the flange, at least partly, extends parallel to the sloped portion of the seat-engaging surface or parallel to the radial plane.

8. The cylinder liner according to claim 1, wherein the sloped portion of the seat-engaging surface is manufactured by a subtractive manufacturing process.

9. The method for manufacturing a cylinder liner according to claim 1, comprising a step of machining the seat-engaging surface of the flange so as to form the sloped portion of the seat-engaging surface.

10. The method according to claim 9, further comprising the steps of:
providing a half-finished cylinder liner;
applying a compressive force onto a first end of the half-finished cylinder liner, wherein the step of machining the seat-engaging surface of the flange is carried out while the step of applying the compressive force is performed.

11. The method according to claim 10, wherein the step of applying the compressive force is performed such that the seat-engaging surface of the half-finished cylinder liner has a part which extends along at least a half of the radial length of the seat-engaging surface and which is inclined relative to the radial plane in an opposed direction compared to the sloped portion of the cylinder liner.

12. The cylinder liner according to claim 1, wherein the sloped portion of the seat-engaging surface extends along at least 80% or 90% of the radial length of the seat-engaging surface.

* * * * *